United States Patent
Salamoun et al.

(10) Patent No.: US 10,812,379 B2
(45) Date of Patent: Oct. 20, 2020

(54) BAGGAGE MESSAGING HANDLING SYSTEMS AND METHODS

(71) Applicant: Amadeus S.A.S., Biot (FR)

(72) Inventors: Gus Salamoun, Boca Raton, FL (US); Matthew Parker Willingham, Jacksonville, FL (US)

(73) Assignee: AMDEUS S.A.S., Biot (FR)

( * ) Notice: Subject to any disclaimer, the term of this patent is extended or adjusted under 35 U.S.C. 154(b) by 188 days.

(21) Appl. No.: 15/623,578

(22) Filed: Jun. 15, 2017

(65) Prior Publication Data

US 2018/0367454 A1 Dec. 20, 2018

(51) Int. Cl.
| | |
|---|---|
| *H04L 12/24* | (2006.01) |
| *H04L 12/741* | (2013.01) |
| *B64F 1/36* | (2017.01) |
| *H04L 29/08* | (2006.01) |
| *H04W 4/029* | (2018.01) |
| *H04L 29/06* | (2006.01) |

(52) U.S. Cl.
CPC .............. *H04L 45/74* (2013.01); *B64F 1/368* (2013.01); *H04L 67/2819* (2013.01); *H04L 67/2823* (2013.01); *H04L 67/2838* (2013.01); *H04L 69/22* (2013.01); *H04W 4/029* (2018.02); *H04L 67/1097* (2013.01)

(58) Field of Classification Search
CPC . H04L 45/74; H04L 67/1097; H04L 67/2823; H04L 67/2838; H04L 67/2819; H04L 69/22; B64F 1/368; H04W 4/029
USPC ........................................................ 709/204
See application file for complete search history.

(56) References Cited

U.S. PATENT DOCUMENTS

| | | | | |
|---|---|---|---|---|
| 9,398,795 | B2 * | 7/2016 | Gupta | G06Q 10/0833 |
| 10,250,639 | B2 * | 4/2019 | Redlich | G06Q 10/10 |
| 10,360,785 | B2 * | 7/2019 | Malinofsky | H04W 40/244 |
| 10,460,837 | B1 * | 10/2019 | LaBorde | G06K 7/10366 |
| 2004/0025117 | A1 | 2/2004 | Ingersoll et al. | |
| 2005/0201304 | A1 | 9/2005 | Olshansky | |

(Continued)

FOREIGN PATENT DOCUMENTS

| | | |
|---|---|---|
| EP | 070512 A2 | 4/1996 |
| WO | 9933226 A1 | 7/1999 |

OTHER PUBLICATIONS

SITA BagJourney: How it Helps. Retrieved from the Internet at https://www.sita.aero/solutions-and-services/products/bagjourney, 2017.

(Continued)

*Primary Examiner* — Moustafa M Meky
*Assistant Examiner* — Elizabeth Kassa
(74) *Attorney, Agent, or Firm* — Thompson Hine LLP

(57) ABSTRACT

Access points for a baggage message handling system, baggage message handling systems, and methods associated with message communication in a baggage message handling system. The system includes an input/output interface suitable for connecting to an external system, a converter configured to convert a message received via the input/output interface and/or a message to be transmitted via the input/output interface into a predetermined format, an extractor configured to extract metadata from a converted message, and a transmit and/or receive unit configured to transmit and/or receive a further message including extracted metadata and associated address information.

20 Claims, 7 Drawing Sheets

(56) References Cited

U.S. PATENT DOCUMENTS

| | | | | |
|---|---|---|---|---|
| 2006/0265508 | A1* | 11/2006 | Angel | H04L 29/12047 |
| | | | | 709/230 |
| 2008/0130682 | A1 | 6/2008 | Akadiri | |
| 2009/0015398 | A1* | 1/2009 | Bhogal | A45C 13/18 |
| | | | | 340/539.13 |
| 2009/0193096 | A1 | 7/2009 | Boyer et al. | |
| 2009/0307321 | A1* | 12/2009 | Sawant | G06Q 10/02 |
| | | | | 709/206 |
| 2011/0231212 | A1* | 9/2011 | Hurley | G06Q 10/02 |
| | | | | 705/5 |
| 2011/0267192 | A1* | 11/2011 | Goldman | G06Q 10/107 |
| | | | | 340/568.1 |
| 2013/0214909 | A1* | 8/2013 | Meijers | H04W 4/029 |
| | | | | 340/10.5 |
| 2014/0291405 | A1* | 10/2014 | Harkes | G06K 19/0716 |
| | | | | 235/492 |
| 2016/0042316 | A1* | 2/2016 | Gates | G06Q 10/08 |
| | | | | 700/230 |
| 2016/0075449 | A1* | 3/2016 | Ziegler | G06K 19/07713 |
| | | | | 700/227 |
| 2017/0169528 | A1* | 6/2017 | Kundu | G06Q 50/14 |
| 2018/0293871 | A1* | 10/2018 | Malinofsky | G06Q 10/0833 |
| 2020/0013275 | A1* | 1/2020 | Malinofsky | G01S 5/14 |

OTHER PUBLICATIONS

SITA News Release, Mar. 10, 2015. Retrieved from the Internet at https://www.sita.aero/pressroom/news-releases/sita-provides-smart-technology-to-track-a-bag-like-a-parcel.

SITA BagMessage, Retrieved from the internet at https://www.sita.aero/globalassets/docs/use-cases/bagmessage-use-case.pdf, Published Aug. 15, 2016.

SITA BagMessage: How it Helps. Retrieved from the Internet at https://www.sita.aero/solutions-and-services/products/bagjourney, 2017.

European Patent Office, Search Report issued in Application No. 18 17 7588 dated Sep. 13, 2018.

National Institute of Industrial Property, Written Opinion issued in French Application No. 1755401 dated Jan. 23, 2018.

\* cited by examiner

BAGGAGE MESSAGING HANDLING SYSTEMS AND METHODS

BACKGROUND

The present invention relates to baggage messaging handling systems and methods and, in particular, to access points for a baggage message handling system, baggage message handling systems, and methods associated with message communication in a baggage message handling system.

The aviation industry has enjoyed considerable growth over the last decades. With the growth in passenger numbers the number of pieces of baggage that need transported has also increased considerably. Loss of baggage is costly, both in terms of the efforts expended in recovering the lost piece of baggage as well as in terms of reputational damage.

SUMMARY

Embodiments of the invention relate to an access point for a baggage message handling system. The access point comprises an input/output interface suitable for connecting to an external system, a converter configured to convert a message received via the input/output interface and/or a message to be transmitted via the input/output interface into a predetermined format, an extractor configured to extract metadata from a converted message and a transmit and/or receive unit configured to transmit and/or receive a further message comprising extracted metadata and associated address information.

The converter may be configured to access a database storing one or more communication protocols and to convert the message format based on said stored protocols.

The converter may be configured to bind metadata received via the transmit/receive unit to a message that is to be sent via the input/output interface in accordance with a stored communication protocol.

The extractor may be a parser that emits and consumes events as a parse tree is traversed.

The access point may be further configured to create a message to be sent via the transmit/receive unit by combining extracted metadata with a unique transaction ID.

Embodiments of the invention also relate to a baggage message handling system comprising a plurality of the above described of access points and one or more routers configured to route a message received through a transmit/receive unit of an access point based at least in part on content of metadata that forms part of the message.

The router may access routing rules and route the message based on the routing rules. The routing rules may link pieces of information included in the metadata to achieve routing at a finer level of granularity than would be possible based on single pieces of metadata only. The rules may, in particular, link pieces of metadata in a manner that is specific to a destination, such as a destination airport, to allow routing of the message to a sub-system or area of the destination.

The router can be configured to route messages according to routing rules, and to dynamically compile said routing rules at or immediately prior to their use.

Embodiments of the invention also relate to a baggage message handling system comprising a plurality of the above described access points and distributed storage for storing messages received through the input/output interface of an access point as well as information indicating the routing state of associated messages transmitted through the transmit/receive unit of the access point.

The information may comprise a full routing history of the associated message.

The router may be configured, upon re-start, to access the distributed storage and route messages for which associated routing states indicate that routing is incomplete.

The distributed storage can be accessible by a plurality of routers.

The baggage message handling system can be configured to associate one access point which each logical client that is to be communicated with.

The baggage message handling system may be configured to track the location of individual baggage items by tracking messages comprising metadata identifying the item and received from one or more access points with known locations.

Embodiments of the invention also relate to a method of communicating a message between a baggage message handling system and a system external to the baggage message handling system. The method comprises receiving a message from the external system via an input/output interface, converting the received message to a predetermined format, extracting metadata from the converted message and transmitting to the baggage handling message system a message comprising extracted metadata and associated address information.

Embodiments of the invention also relate to a computer program product comprising computer executable instructions that, when executed by a processor cause an access point for a baggage message handling system to accept via an input/output interface a message from an external system, convert the received message to a predetermined format, extract metadata from the converted message and transmit to the baggage handling message system a message comprising extracted metadata and associated address information.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
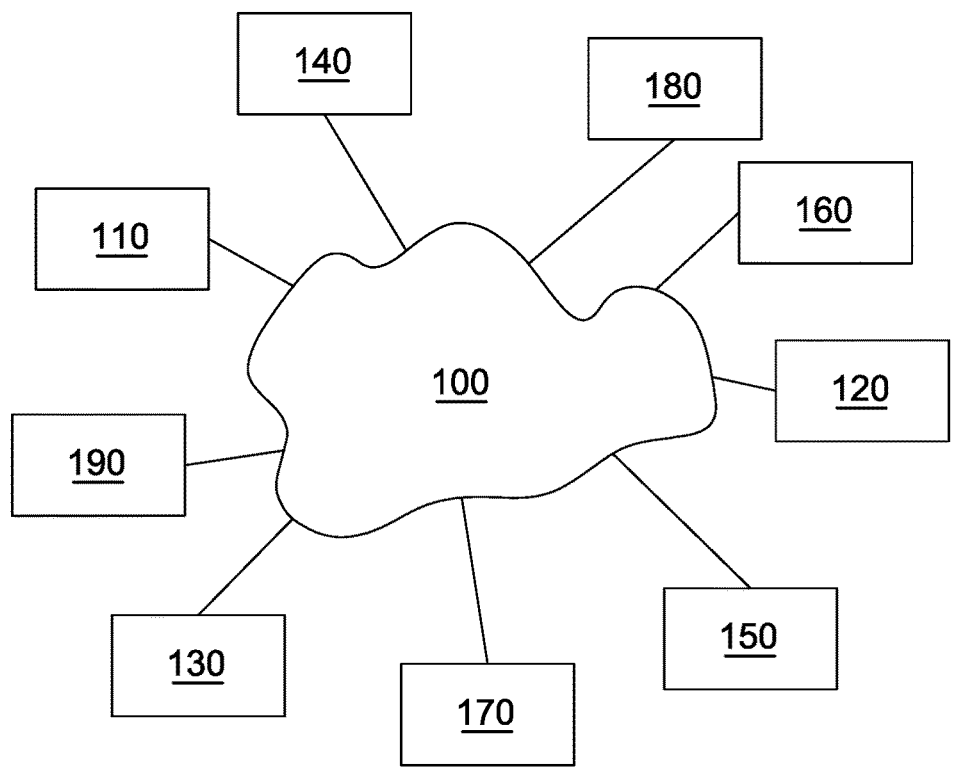
FIG. 1 shows a baggage message distribution system according to an embodiment.

FIG. 1 shows a baggage message distribution (BMD) system 100 according to an embodiment. The baggage message distribution system 100 facilitates effective communication between a variety of systems dealing with baggage messages and, in particular, can interface with external systems without need to modify such external systems. These external systems include, but are not limited to, departure control systems 110 to 130, baggage sortation systems 140 to 160 and baggage reconciliation systems 170 to 190. The departure control systems 110 to 130 may be run by different airlines in a particular airport or in a number of airports or by a particular airline in a number of airports. The different baggage sortation systems 140 to 160 and the baggage reconciliation systems 170 to 190 may be in operation in different airports. It will be appreciated that the above mentioned airports do not have to all be in one country, let alone in a particular country.

It will be appreciated that, with increasing popularity in air traffic, the number of pieces of baggage being transported every day is very large and steadily increasing. The amount of data relating to baggage transport that is constantly generated is therefore large. This fact alone renders the handling and distribution of baggage messages challenging.

Moreover, airline and airport data handling systems invariably use different methods and conventions of data handling. As a consequence the exchange of messages between such systems tends not to be possible, let alone possible in a highly reliable fashion at high message volumes.

Figure 2:
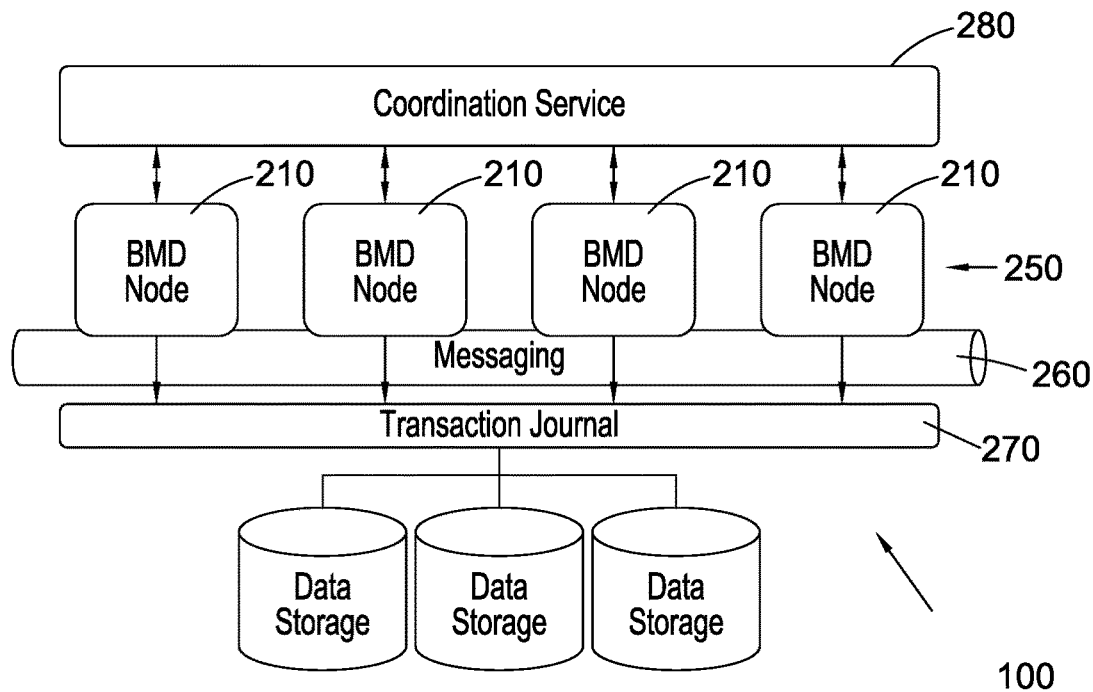
FIG. 2 shows the architecture of one embodiment of the baggage message distribution system at a high level.

FIG. 2 shows the architecture of one embodiment of the baggage message distribution (BMD) system 100 at a high level. The system 100 comprises a plurality of nodes 210 that form a cluster 250 spanning the geographic area covered by the BMD system 100. In an embodiment, each node is host to a set of services in the system. Every component in the system 100 is considered a service, with 'service' simply referring to a (bundled) runtime unit that can be installed and run on any node in the cluster 250.

The nodes 210 are connected by a messaging system 260 to allow services to address each other between nodes. In one embodiment, the messaging system used is ActiveMQ. In an embodiment, the nodes 210 form a network of brokers, which renders each node 210 in the network implicitly visible from any other node 210 in the network. A transaction journal 270 comprises a set of tables that are used for tracking and journaling message flow and transaction status throughout the system. Each message from a node 210 is made available to at least one other node 210 so that node failure does not lead to loss of any messages.

Because the BMD system 100 is a distributed system spanning any number of nodes, a shared coordination service 280 coordinating the nodes 210 is provided. This service 280 will provide a cluster-wide context for each node 210 to allow the advertisement of services hosted by a node 210, as well as to announce the ability or inability of a node 210 to participate in processing activities. The coordination service 280 is configured to facilitate the election of a leader amongst the nodes 210 in the cluster 250, to provide a registry of all of the services offered by the nodes 210 in the cluster 250, to monitor the status of the nodes 210 and the services they provide, and to balance workloads within the cluster 250. In one embodiment, the coordination service 280 is provided by machines different to those providing the BMD nodes 210. The coordination services themselves can be clustered, which ensures high availability and tolerance against failure of the coordination service 280.

Each individual component in the nodes 210 is deployed a configurable number of times on a configurable number of nodes across the cluster 250 without any hard dependencies to its host location. This allows new nodes to be added at runtime and provisioned dynamically. Dynamic deployment of the individual components allows rebalancing computational resources across the cluster during failover based on the addition or subtraction of active nodes.

Figure 3:
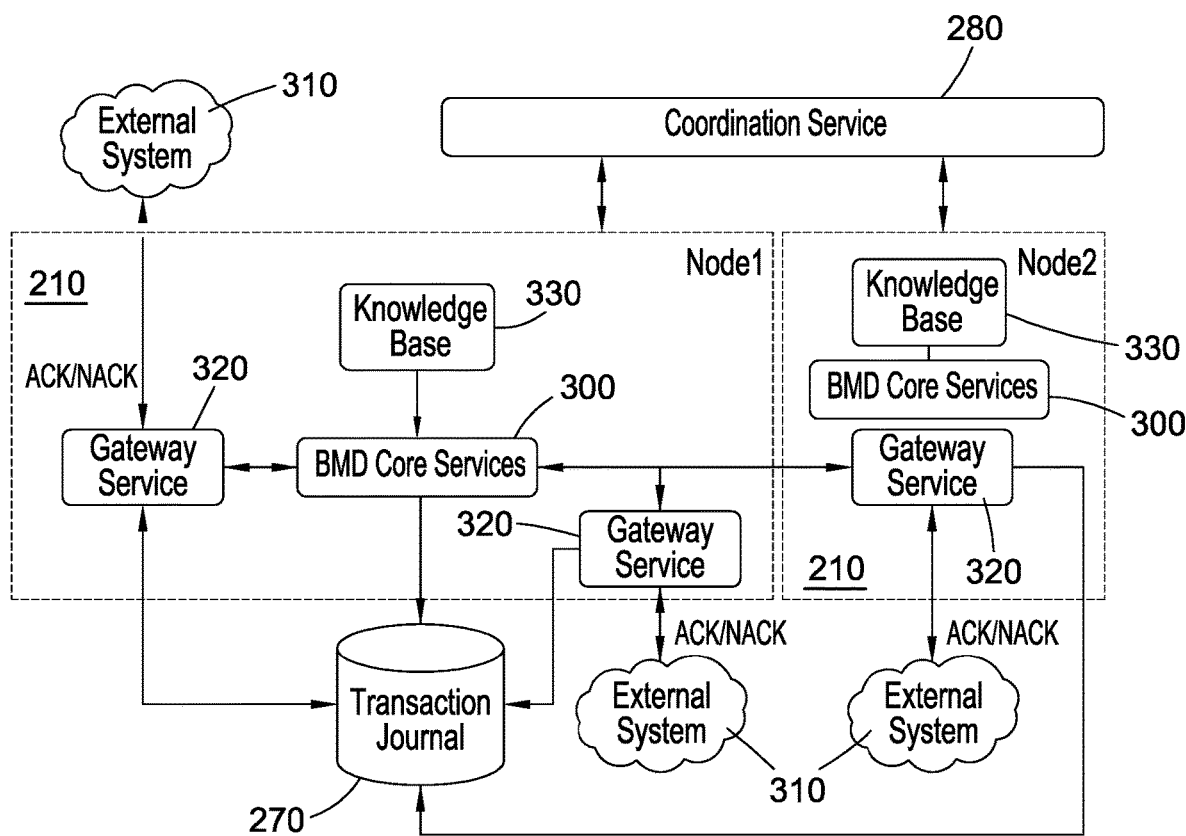
FIG. 3 provides an overview of the architecture of individual nodes according to an embodiment.

FIG. 3 provides an overview of the architecture of individual nodes 210 according to an embodiment, as well as of the manner in which the nodes 210 are in communicative connection with surrounding elements. A node 210 comprises an application server within which a set of BMD core services 300 are deployed. All communication with external systems 310 are handled by gateway services 320 responsible for protocol adaptation, session maintenance and all other domain specific behaviors. The external systems include, but are not limited, to the departure control systems 110 to 130, baggage sortation systems 140 to 160, and baggage reconciliation systems 170 to 190 shown in FIG. 1.

Once a message has been received and appropriately processed by a gateway service 320, it will be handed off to the BMD core services 300 for appropriate routing and delivery. The core services 300 compute the delivery path of the message based on a set of pluggable routing rules stored in the knowledge base 330. These rules are, in the embodiment, dynamically compiled scripts and can, consequently, be modified during system runtime to adjust routing behaviour without incurring downtime. Once the appropriate routing paths are determined, the coordination service 280 resolves the service addresses in the cluster for the intended recipient systems' gateway services 320.

While a copy of the knowledge base 330 is, in one embodiment, present in each node, in another embodiment the knowledge base 330 may be stored in a form that can be accessed by each service in the cluster as required. As such, only a single copy of the knowledge base 330 needs to be stored, thereby saving storage space. Advantageously, a number of copies are maintained for redundancy purposes. In one embodiment, the copy or copies of the knowledge database 330 are distributed throughout the cluster. The rules stored in the knowledge base 330 can be updated during runtime. The knowledge base 330 is configured to transmit notifications to the routers in the cluster of any updates to the rules, so that the routers operate using the most up to date rule set available.

All services, including the coordination service 280, are configured to register themselves with a service registry to announce their presence and availability in the system 100. The services can consequently be individually addressed across any node in the cluster. In one embodiment, the router 300 is responsible for resolving the correct internal service addresses used during message delivery.

The services are also configured to reconfigure themselves on demand at runtime upon request from the coordination service to allow for load balancing etc. The service registry is maintained as part of the coordination service 280. As mentioned above, the coordination service 280, in one embodiment, forms a highly available secondary cluster separate from the BMD node set with a minimum of three nodes. An entry in the registry only persists while the service is active and running, and expires at any time the service is shut down or faults. As the coordination service 280 is operated in a separate cluster, the likelihood of it failing together with a node 210 running a failed service is very low. Each node 210 maintains an active connection to the coordinator service 280, which is in embodiments, run on a separate machine. These connections create a session alongside data objects that are bound to that session. The coordination service 280 monitors sessions. In the event that the node 210 goes offline and the session is lost, the coordination service 280 can re-distribute actions associated with failed sessions to other nodes. Offline services can be rapidly detected in this manner, which permits easy auditing of cluster state and reaction to service lifecycle events and failures in an event-based manner.

Figure 4:
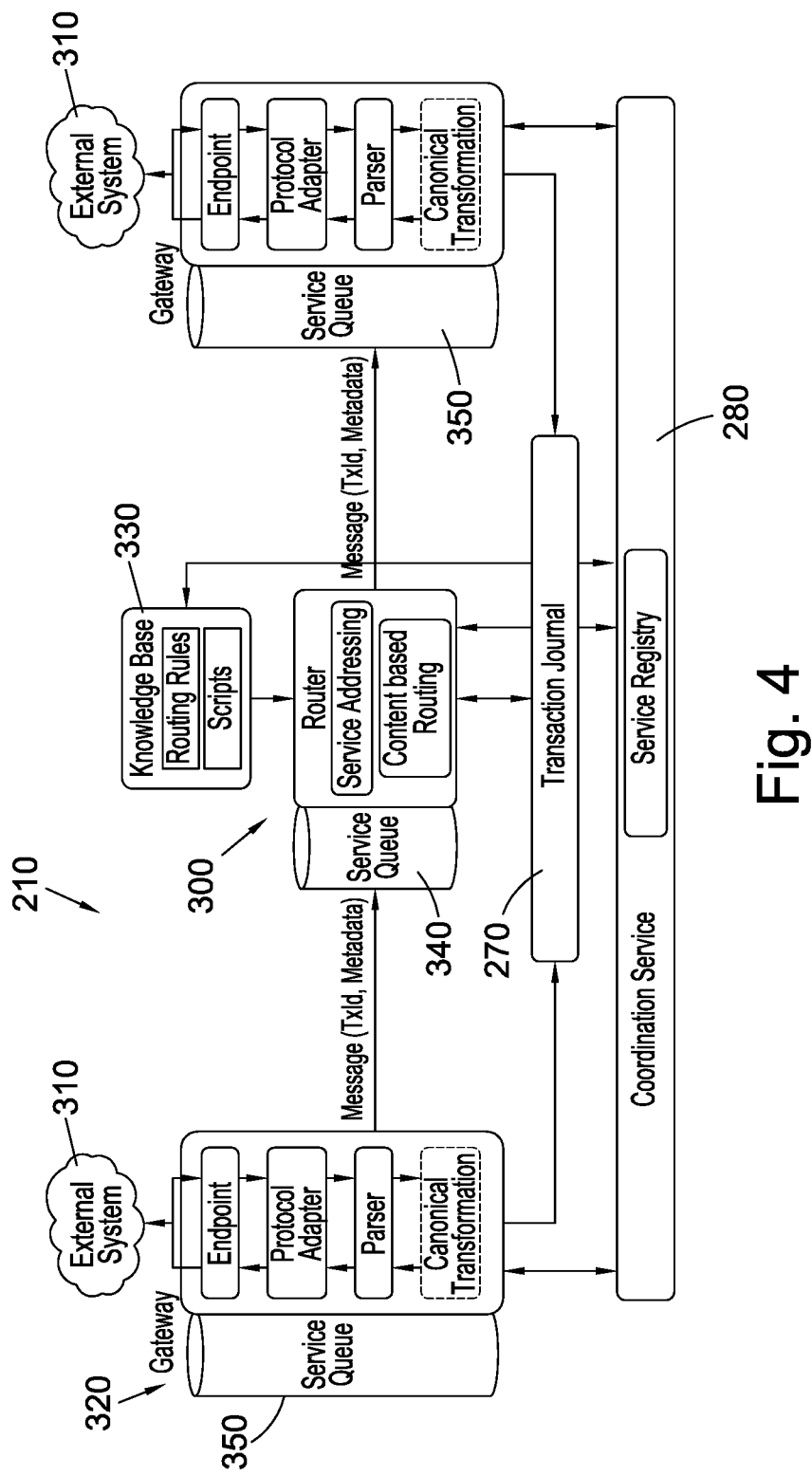
FIG. 4 provides a more detailed view of the architecture of an individual node according to an embodiment.

FIG. 4 provides a more detailed view of the architecture of an individual node 210. Each of the BMD core service 300 and the gateways 320 include its own queue 340 and 350, respectively, which will be globally available across the cluster via the messaging system. In the event of the failure of service messages which have started to be routed through the cluster but have not yet been delivered can be retrieved from a queue, they inhabit when the service had failed and routing can be re-started. The system, in one embodiment, is equally configured to use queues of other services to buffer spike loads. In this manner, peak traffic can be accommodated and processed smoothly over an operational period.

The gateways 320 receive messages from connected external systems 310 and convert these messages from the format in which they have been received into a format for exchange within the BMD 100. All of the thus re-formatted messages are stored within the transaction journal 270. Storage in the transaction journal 270 allows rendering the queues 340 and 350 non-persistent. Non-persistent queues are preferred for performance reasons. Should some of the non-persistently queued messages be lost, then the queues 340 and 350 are re-populated on the basis of the transaction journal 270.

In one embodiment, each node 210 contains a node agent. The node agent is responsible for monitoring the health of the machine on which the node 210 is running as well as of the JVM in which this node 210 is running. The node agent in particular monitors the level of CPU usage by the node's operating system and the memory capability of the JVM. The CPU usage and JVM memory capabilities of nodes running the same services are compared so that heavily and least heavily loaded nodes are identified. On this basis, cluster-wide knowledge of least-loaded nodes is obtained. The node agent is configured such that, during heavy peaks, traffic messages are automatically routed to the most appropriate node in the cluster at any given time to ensure optimal load distribution.

Figure 5:
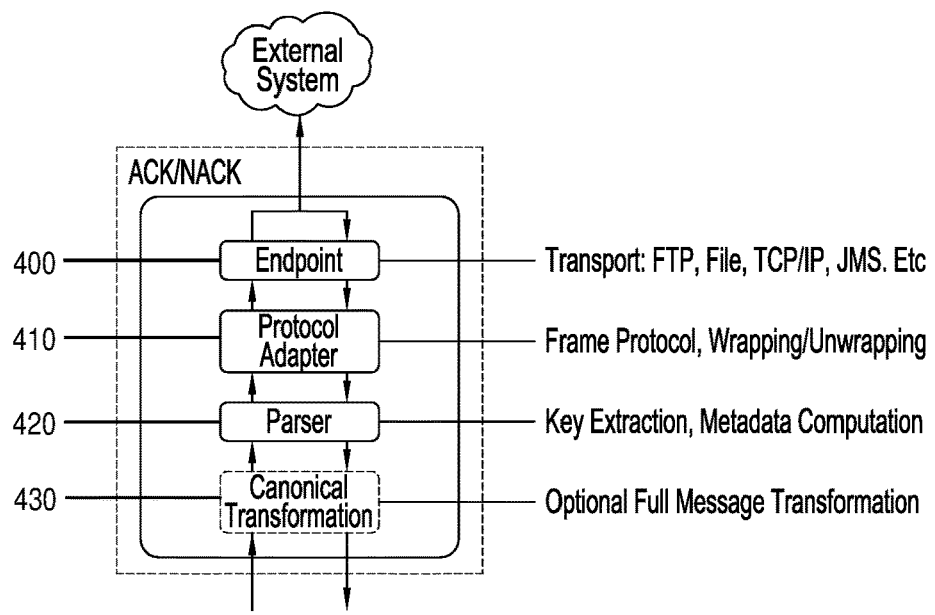
FIG. 5 shows the architecture of a gateway service according to one embodiment.

FIG. 5 shows the architecture of a gateway service 320 according to one embodiment. A gateway 320 encapsulates all transport, protocol and session semantics required for communication with an external system. Gateway services 320 facilitate the accommodation of existing systems so that external systems that are to be connected to the BMD system 100 do not need to be modified. The endpoint 400 supports all interaction with the external system 310, supporting responsibilities such as TCP/IP frame decoding/encoding, heartbeat generation and authentication mechanisms. The gateway 320 is the effective boundary point for ingress into and egress out of the BMD 100. In one embodiment, a single gateway 320 per logical external system 310 is deployed, which creates a one-to-one mapping for gateway 320 to client.

The endpoint 400 is provided to allow communication with the external system 310 using a communications methods such as but not limited to the following: TCP/IP, UDP, S/FTP/S, JMS, Web Services (SOAP/REST), etc. The endpoint 400 relies on pre-existing protocols of this nature but may be configured to store new and/or updated protocols to adapt to custom communication protocols that may be used by some external systems 310. In one embodiment, the endpoint 400 is configured to use a string-based URI to allow node-wide property replacement. By defining a local IP address to which a service needs to be bound as one of the service's properties, the service can be re-scheduled to run on a replacement node 210 if the node 210 on which it had originally run fails.

The gateway 320 moreover includes a protocol adaptor 410. The protocol adaptor 410 is responsible for the translation to/from a domain-specific data format. The endpoint 400 decouples this translation from the actual transport mechanism employed. The protocol adaptor 410 is configured to add and remove protocol envelopes and to transform from/to a known data format used by an external system. If a message is received at the gateway 320, this includes re-binding to the message appropriate metadata produced during the propagation of the message inside the BMD 100. Such metadata can be, for example, message sequence identifiers. The operation of the protocol adaptor 410 will be described in more detail below with reference to FIG. 6.

The gateway 320 moreover includes a parser 420 that is configured to parse and validate arriving messages. Such messages may be IATA 1745 Baggage Messages, IATA Baggage XML messages or any other message type exchanged in the BMD 100. The parsing of Type-B messages is accomplished through the implementation of Extended Backus-Naur Form (EBNF) grammars which are used to generate parsers with the ANTLR framework. The generated parsers 420 provide an event-driven callback mechanism that behaves similarly to a SAX parser, with events being emitted and consumed as the parse tree is traversed. It will be appreciated that other parser technologies may be used in different embodiments.

During the parsing and validation process, metadata is extracted from the message payload for use in downstream routing. The extracted metadata can include one or more of information regarding airports of involvement, flight numbers, airlines, LPC, TTY addresses, etc. If irregularities with the message format are detected that prevents proper routing, these errors will be identified and marked by the parser for use in later message inspection and reporting. The parser 420 can extract metadata irrespective of the original format of the message.

Optionally, the gateway 320 includes a canonical transformation means 430 to transform the metadata extracted by parser 420 into a unique namespace and schema for each type of data to be routed through the system. In one embodiment, for example, each IATA 1745 subtype (e.g. BSM, BPM or BTM) has its own namespace, e.g. com.amadeus.apt.bmd.bsm. The metadata schema is internal to the system described herein in one embodiment and is configured to identify all attributes and nested structures representing a type of data. The com.amadeus.apt.bmd.iata namespace may, for example, include individual schema for BSM, BTM, BPM, etc. This may be based on the IATA 1745 standard. A full identifier is therefore, in one embodiment, com.amadeus.apt.bmd.iata.bsm. It will be appreciated that the canonical transformation means 430 does not need to operate on messages received at the gateway 320 for output to the external system 310 as the message to be output to the external system 310 is re-assembled by the protocol adapter 410.

It is important to note that, while a gateway 320 will be used for both inbound and outbound flows, each will have separate processing concerns. An outbound flow, for example, will never require that parse or canonical transformation logic be applied. It is also possible for a single gateway to be comprised of many different routes and endpoints depending on the demands of the client system.

Figure 6:
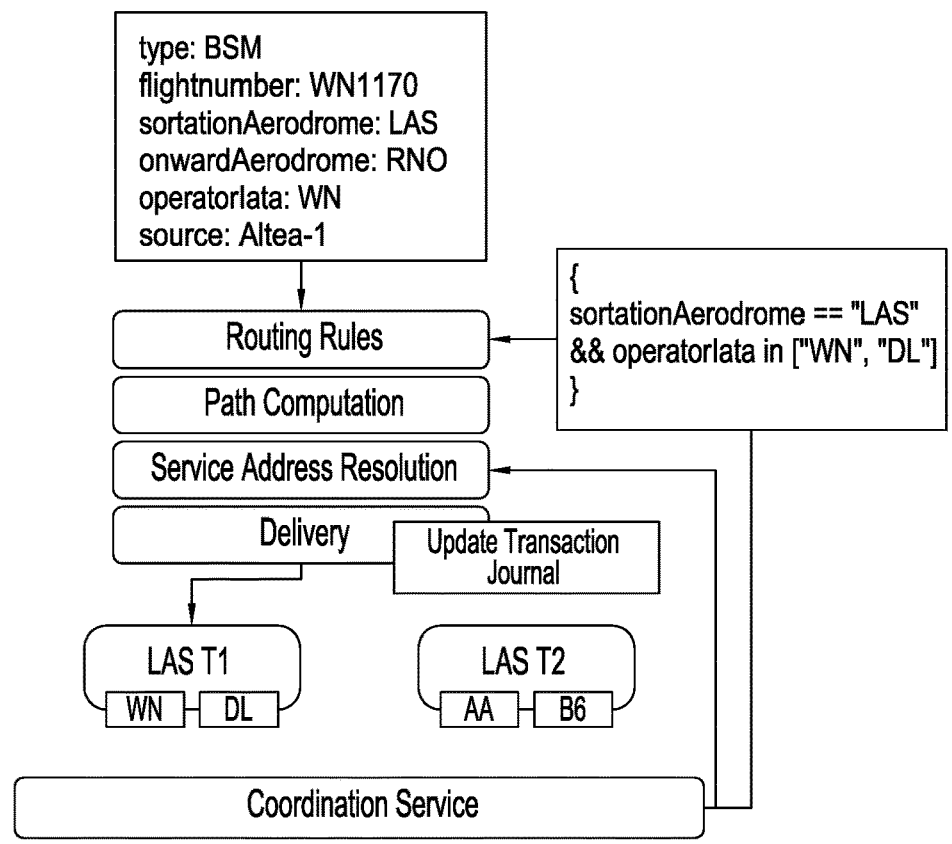
FIG. 6 shows the flow of data within a router.

FIG. 6 shows the flow of data within a router 300. The router can receive the metadata extracted from a message. Whilst the routing destination may partially identify the destination of the message, baggage handling messages presently tend not to allow unambiguous identification of individual destination locations. The destination provided may, for example, merely be the aerodrome to which the baggage is to be directed. However, no more accurate destination data may be available. Routing based on this destination data may at best be able to deliver the message to the correct geographical location. However, no more precise delivery is possible. To allow more precise routing, the routers are configured to inspect the metadata and make routing decisions on the basis of it. To facilitate these decisions, each router stores or is in communicative connection with a memory that stores in a separate physical location content-based routing rules configured to decide, based on the content of the message as encoded in the metadata and on information received from the coordination service, the path through which the message should be routed to reach a particular destination service. Such a destination service can be a destination gateway that is connected to a particular external system to which the internal message is to be delivered in the form of a bag message.

The content based routing rules can, for example, link various pieces of information included in the metadata in a manner that specifically reflects handling requirements in a particular airport. A message may, for example, be destined for a particular airport, wherein the metadata, however, fails to specify a particular part of the airport, say a particular terminal. At least, if different terminals of the airport include separate physical or data infrastructure, then delivery of the message to the incorrect terminal is undesirable. The content-based routing rules link metadata entries to achieve routing at a finer level of granularity than is achievable based on a single piece of metadata only. A content-based routing rule may, for example, define which terminal of a destination airport a message should be routed to based on information of the carrier to which the message relates, based on an ultimate destination airport if the message relates to a stopover of a flight, etc.

Content-based routing may therefore be defined as routing that combines a number of pieces of information within the metadata based on some information in the metadata to achieve a granularity of routing that is finer than the granularity of routing that would be achievable if only on piece of information of the metadata or only the piece of information of the metadata upon which the combination is based was used for routing.

Content-based routing may, for example, be aerodrome based, for example defining routings based on airport of departure, various stopovers/transfer points, and final destination, airline-based, for example defining routings based on specific airline constraints, carrier vs. operator in preferred terminals, domestic vs. international flights based on trip number ranges, for example trip numbers from 0001-3000 operate in domestic terminal, but 4000+ operate in international terminal, LPC (Bag tag license plate)-based, for example defining routings based on the LPC prefix of a BSM, or the LPC itself if reverse routing of a BPM back to the producing system is performed, message type-based, for example defining routings based on internal datatype namespace (representing a BSM, Flight Record, etc.) to target specific systems based on datatype or any combination of these routing types. It will be appreciated that the routing examples provided here merely illustrate some of many ways of combining pieces of information of the metadata to improve the granularity of routing.

The information received from the coordination service can include one or more of the following: information regarding the types and locations of services within the destination (in the example of FIG. 6 the destination aerodrome); information identifying the systems within the aerodrome belonging to carriers of interest; or location information of equipment allocated to a particular flight within the destination aerodrome.

In one embodiment, one or more or each node 210 in the system 100 maintains a configurable router pool, allowing for the parallel routing of messages from each connected system.

In one embodiment, the routers 300 are configured to all updating of routing rules and service addresses in real-time. The coordination service is configured to broadcast the information necessary for such updates when needed and/or available. The need for updates can occur as a result of an event, such as the failure of a service or entire node, within the system 100. The entire update publishing mechanism may be event-based in this manner.

The routing rules conform to a format that can be compiled dynamically inside the router. In this manner, the rules can be dynamically modified at runtime without the necessity of restarting or replacing components.

Figure 7:
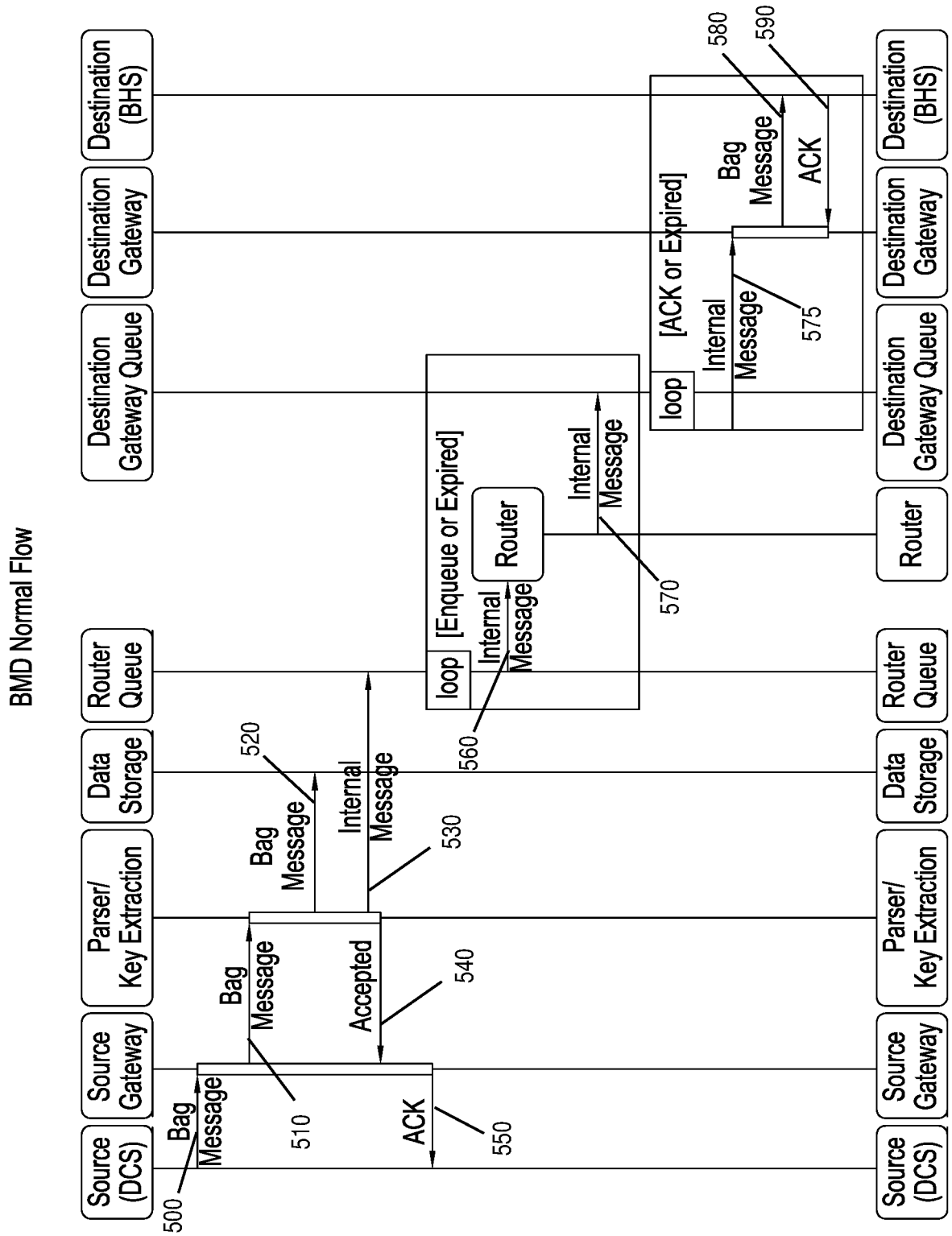
FIG. 7 illustrates an example of message flow through the BMD system.

FIG. 7 illustrates message flow through the BMD system 100. After an original message has been received at an incoming/source gateway 320 in step 500, it is handed to the parser 420 that forms part of the gateway 320 in step 510. The raw payload of the message is stored in the transaction journal 270 in step 520 and the parsed internal message is sent to the router for forwarding to its destination in step 530. Each message contains a unique transaction identifier, as well as the metadata about the payload of the message. As the transaction identifier can be used later to retrieve the full message payload from permanent storage, a message passing through the routing and delivery portion of the system is an extremely lightweight representation of the full message data. Optionally, when necessary, the full originating payload is also be attached to the message. To facilitate retrieval of key data by client users and operational staff, the message data stored includes, in one embodiment, an External System Identifier, a Message Identifier (LPC, etc.), the airline (DCS Provenance) concerned, the airport concerned, the delivery path, the delivery times, indications of errors, and retry counts. It will be appreciated that this list is non-limiting and that other data may additionally be stored. The delivery path is determined by the original router and adhered to by all other routers.

Only once the message has been stored in the transaction journal and forwarded to the router, the parser 420 flags the message as accepted to the incoming/source gateway 320 in step 540. The incoming/source gateway 320 in turn only acknowledges receipt of the message to the source in step 550 following receipt of the acceptance indication from the parser 420.

As discussed, each router 300 comprises a service queue 340. The internal message received at the router 300 from the parser 420 is stored in the router queue 340 for processing, retrieved in step 560, and routed by the router 300 in step 570 to the destination gateway queue 350. It will be appreciated that such routing may involve routing via a number of nodes 210. Whilst gateway services are provided, in an embodiment, they are only used for communication with external systems. All services internal to a cluster can address each other directly without having to go through the gateway services. In one embodiment, the routers 300 of two such nodes communicate via intervening gateway services 320. In another embodiment, the nodes 210 and routers 300 within these nodes 210 are configured to allow direct communication between the routers 300.

Once the internal message has progressed within the queue of the destination gateway 320, it is retrieved by the destination gateway in step 575 and converted into a bag message format that is known to be expected by the destination (a baggage handling system BHS in the case of FIG. 6) in step 580, followed by delivery to the destination and acknowledgement of receipt by the destination in step 590.

Figure 8:
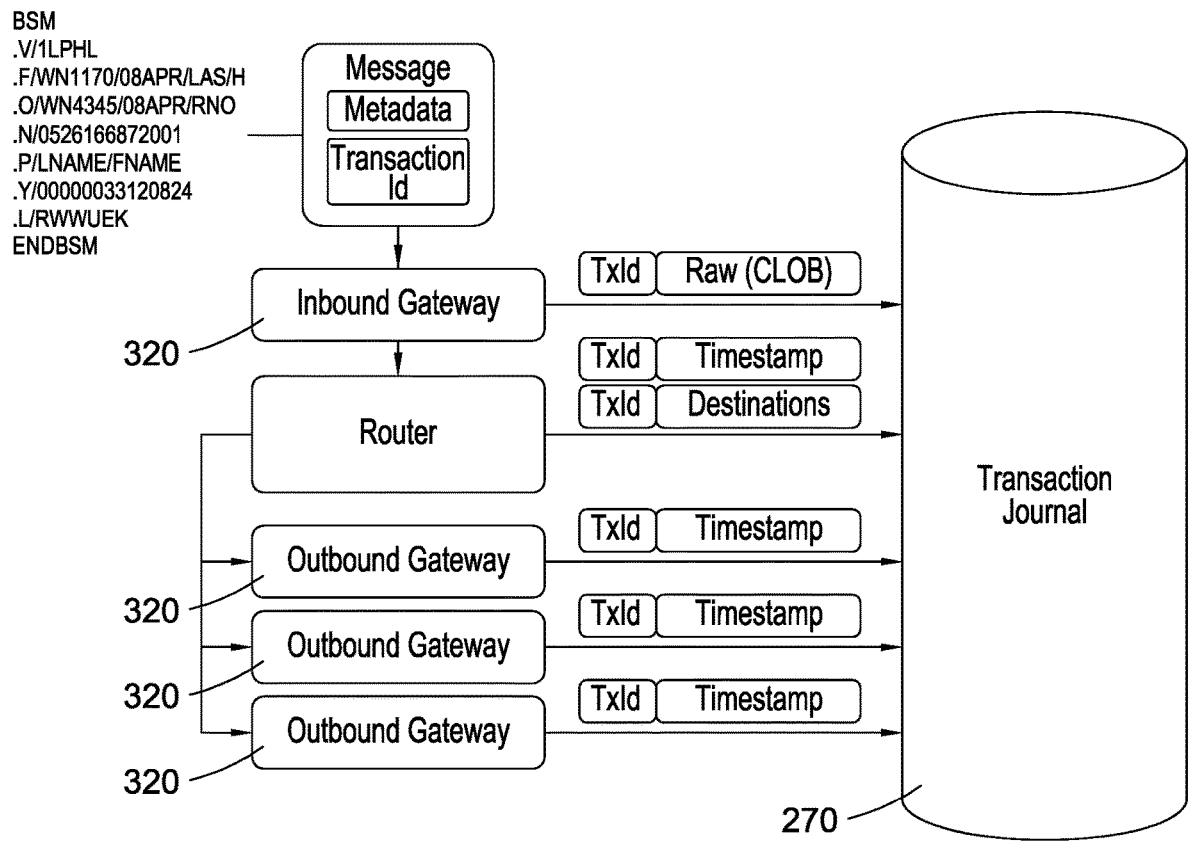
FIG. 8 shows details of the ways in which data are stored in the transaction journal.

FIG. 8 shows details of the ways in which data are stored in the transaction journal 270 as messages are routed from inbound 320 to outbound 320 gateway. After the original message has been received at the inbound gateway 320, its payload is stored in its raw form based on the receipt transport layer (i.e. prior to begin parsed) in the transaction journal 270 alongside a unique transmission ID for the message. As the (now modified) internal message progresses along its delivery route to the outbound gateway(s) 320, each routing node 300 stores a timestamp indicating that the process the node/component has been entrusted to perform has been performed. The inbound gateway also stores the destination address(es) associated with the transmission ID in the transaction journal 270. The timestamp is only stored after completion of the process to which it relates. It is consequently possible to determine whether or not a message has been processed by the inbound gateway 320 and whether or not routing has been completed. Should it be determined that a message in question has not arrived at the destination, the internal message can be re-generated based on the raw data of the original message that had been stored in the transaction journal 270 by the inbound gateway 320. In case a router needs to recover following a disturbance, when the router comes back online, any undelivered and valid messages in the transaction journal will be re-loaded for processing with a priority given to current messages. A transaction is, in one embodiment, a step of forwarding a message from one router to another. In an embodiment, each transaction is assigned to a specific router. It is this router that will complete the transactions assigned to it following recovery. The system is configured to re-assign transactions to other routers, should a compromised router to which particular transactions are assigned fail to recover within a pre-set period of time.

The transaction journal more generally contains entries detailing the movement and current checkpoints of message flow through the BMD. This includes, but is not limited to, accepted, routed, delivered, acknowledged, expired, etc. states, as well as the full raw inbound and outbound payloads. In this manner, the system 100 is configured to fully reconstruct the lifecycle and traversal path of a message at any given time even after fault recovery. As mentioned above, the transaction journal is only ever updated upon a successful checkpoint being reached during message propagation. In the event of a recovery scenario, the system 100 consequently has a guarantee that the message state is at least current or older than the last successful checkpoint attempt in the system. This prevents the loss of presumably delivered messages. The penalty incurred by this is at worst the duplication of a single message to a downstream system after recovery.

In one embodiment, the transaction journal 270 takes the form of a replicated commit log available to all nodes in the cluster through network attached storage. The journaled records have, in one embodiment, a low level and simple format. This enables the use of raw Java database connectivity (JDBC), reducing overheads. From the above, it will be appreciated that no shared data access to any one record is necessary. The system 100 consequently avoids inter-transaction dependencies and achieves high parallel data throughput.

Figure 9:
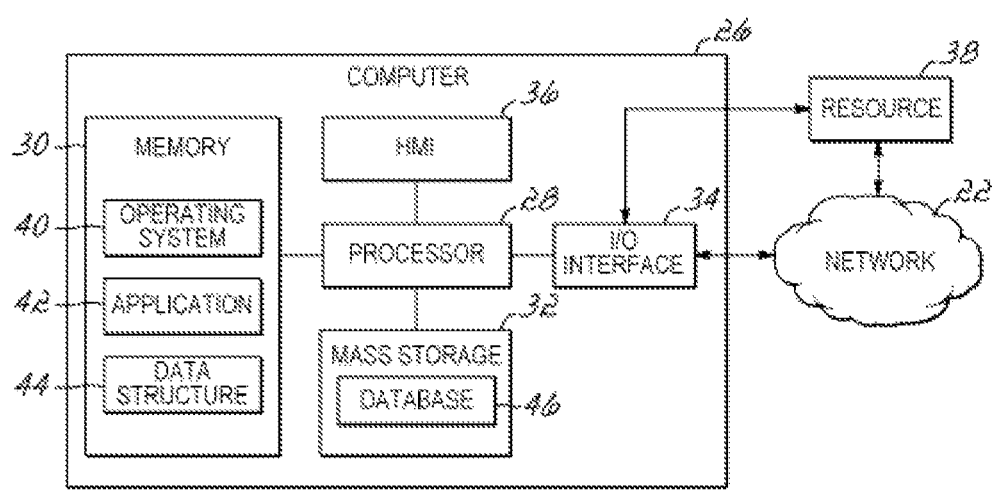
FIG. 9 is a diagrammatic view of an exemplary computer system.

Referring now to FIG. 9, the systems, platforms, modules, units, etc. described herein may be implemented on one or more computing devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 22 or I/O interface 34. External resources may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. Memory 30 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

Processor 28 may operate under the control of an operating system 40 that resides in memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 22 or external resource 38. The application 42 may thereby work cooperatively with the network 22 or external resource 38 by communicating via the I/O interface 34 to provide the various features, functions, applications, processes, or modules comprising embodiments of the invention. The application 42 may also have program code that is executed by one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 22, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, pushbuttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An access point for a baggage message handling system, the access point comprising:
   an input/output interface coupling the access point to an external system;
   a processor coupled to the input/output interface; and
   a memory coupled to the processor, the memory storing data comprising program code that, when executed by the processor, causes the access point to:
   convert, by the access point, a message received via the input/output interface into a predetermined format for exchange within the baggage message handling system to create a converted message;
   extract, by the access point, metadata from the converted message; and
   generate, by the access point, an internal message having the predetermined format, the internal message comprising the extracted metadata and an internal service address associated with an outbound gateway service of the baggage message handling system.

2. The access point of claim 1 wherein converting the message comprises:
   accessing a database storing one or more communication protocols; and
   converting the message format based on the stored communication protocols.

3. The access point of claim 2 wherein the program code, when executed, further cause the access point to:
   bind metadata produced during propagation of internal messages within the baggage message handling system to messages for output to external systems via the input/output interface based on one of the stored communication protocols.

4. The access point of claim 1 wherein the program code, when executed, further cause the access point to:
   emit and consume events as a parse tree is traversed while parsing and validating messages received from external systems via the input/output interface.

5. The access point of claim 1 wherein the internal message further comprises a unique transaction ID.

6. A baggage message handling system comprising:
   a plurality of access points, each of the access points including an input/output interface communicatively coupled to an external system, wherein each access point is configured to:
   convert, by a respective access point, a message received via the input/output interface into a predetermined format for exchange within the baggage message handling system to create a converted message;
   extract, by the respective access point, metadata from the converted message; and
   generate, by the respective access point, an internal message having the predetermined format, the internal message comprising the extracted metadata and an internal service address associated with an outbound gateway service of the baggage message handling system; and
   one or more routers configured to route each internal message received from one of the plurality of access points based at least in part on a content of metadata that forms part of that internal message.

7. The baggage message handling system of claim 6 wherein each router is further configured to:
   route internal messages according to routing rules; and
   dynamically compile the routing rules at or immediately prior to their use.

8. The baggage message handling system of claim 6 wherein each access point is further configured to communicate with a logical client.

9. The baggage message handling system of claim 6 wherein the baggage message handling system is configured to track locations of individual baggage items by tracking messages comprising metadata that identifies the baggage item and that is received from one or more of the access points having known locations.

10. A baggage message handling system comprising:
    a plurality of access points, each of the access points including an input/output interface communicatively coupled to an external system, wherein each access point is configured to:
    convert, by a respective access point, a message received via the input/output interface into a predetermined format for exchange within the baggage message handling system to create a converted message;
    extract, by the respective access point, metadata from the converted message; and
    generate, by the respective access point, an internal message having the predetermined format, the internal message comprising the extracted metadata and an internal service address associated with an outbound gateway service of the baggage message handling system; and
    a transaction journal providing distributed storage for storing: (i) messages received through the input/output interface of each access point and (ii) information indicating a routing state of internal messages propagating within the baggage message handling system.

11. The baggage message handling system of claim 10 wherein the information comprises a full routing history of a corresponding internal message.

12. The baggage message handling system of claim 10 further comprising:
    a router configured, upon re-start, to access the distributed storage and route each internal message for which the information indicates a corresponding routing state is incomplete.

13. The baggage message handling system of claim 10 wherein the distributed storage is accessible by a plurality of routers.

14. The baggage message handling system of claim 10 wherein each access point is further configured to communicate with a logical client.

15. The baggage message handling system of claim 10 wherein the baggage message handling system is configured to track locations of individual baggage items by tracking messages comprising metadata that identifies the baggage item and that is received from one or more of the access points having known locations.

16. A method of communicating a message between a baggage message handling system and an external system to the baggage message handling system, the method comprising:
- receiving, by an access point, the message from the external system via an input/output interface of the access point;
- converting, by the access point, the received message to a predetermined format for exchange within the baggage message handling system to create a converted message;
- extracting, by the access point, metadata from the converted message; and
- generating, by the access point, an internal message having the predetermined format, the internal message comprising the extracted metadata and an internal service address associated with an outbound gateway service of the baggage message handling system.

17. The method of claim 16 further comprising:
- accessing a database storing one or more communication protocols; and
- converting the message format based on the stored one or more communication protocols.

18. The method of claim 17 further comprising:
- binding metadata produced during propagation of internal messages within the baggage message handling system to messages for output to external systems via the input/output interface based on one of the stored one or more communication protocols.

19. The method of claim 16 wherein the internal message further comprises a unique transaction ID.

20. A computer program product comprising:
- a non-transitory computer-readable storage medium; and
- program code stored on the non-transitory computer-readable storage medium that, when executed by one or more processors, causes an access point for a baggage message handling system to:
- accept, by the access point, via an input/output interface a message from an external system;
- convert, by the access point, the received message to a predetermined format for exchange within the baggage message handling system to create a converted message;
- extract, by the access point, metadata from the converted message; and
- generate, by the access point, an internal message comprising the extracted metadata and an internal service address associated with an outbound gateway service of the baggage message handling system.

* * * * *